(12) United States Patent
Leaney

(10) Patent No.: US 6,429,269 B1
(45) Date of Patent: Aug. 6, 2002

(54) POLYMERIZATION PROCESS

(75) Inventor: Patrick Leaney, Bouc Bel Air (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/712,138

(22) Filed: Nov. 15, 2000

Related U.S. Application Data

(63) Continuation of application No. PCT/GB99/01577, filed on May 18, 1999.

(30) Foreign Application Priority Data

May 19, 1998 (EP) .............................................. 98430013

(51) Int. Cl.$^7$ ................................................. C08F 2/38
(52) U.S. Cl. ................... 526/82; 526/123.1; 526/348.2; 526/348.5; 526/348.6; 526/943; 526/901
(58) Field of Search ........................... 526/348.2, 348.5, 526/348.6, 943, 901, 82, 123.1

(56) References Cited

U.S. PATENT DOCUMENTS 5,688,865 A * 11/1997 Ali et al. ....................... 525/53

FOREIGN PATENT DOCUMENTS

| EP | 0359444 | 3/1990 |
|---|---|---|
| EP | 0811638 | 12/1997 |
| WO | WO98/12231 | 3/1998 |
| WO | WO98/20045 | 5/1998 |
| WO | WO98/30599 | 7/1998 |

* cited by examiner

Primary Examiner—David W. Wu
Assistant Examiner—William K Cheung
(74) Attorney, Agent, or Firm—Finnegan, Henderson, Farabow, Garrett and Dunner, L.L.P.

(57) ABSTRACT

A process for the gas phase polymerization of one or more alpha-olefins in the presence of a polymerization catalyst system under reactive conditions in a fluidized bed reactor which process comprises introducing into the reactor a deactivating agent characterized in that the deactivating agent is introduced close to the reactor wall and that said introduction does not terminate the polymerization reaction.

13 Claims, 1 Drawing Sheet

FIG.1
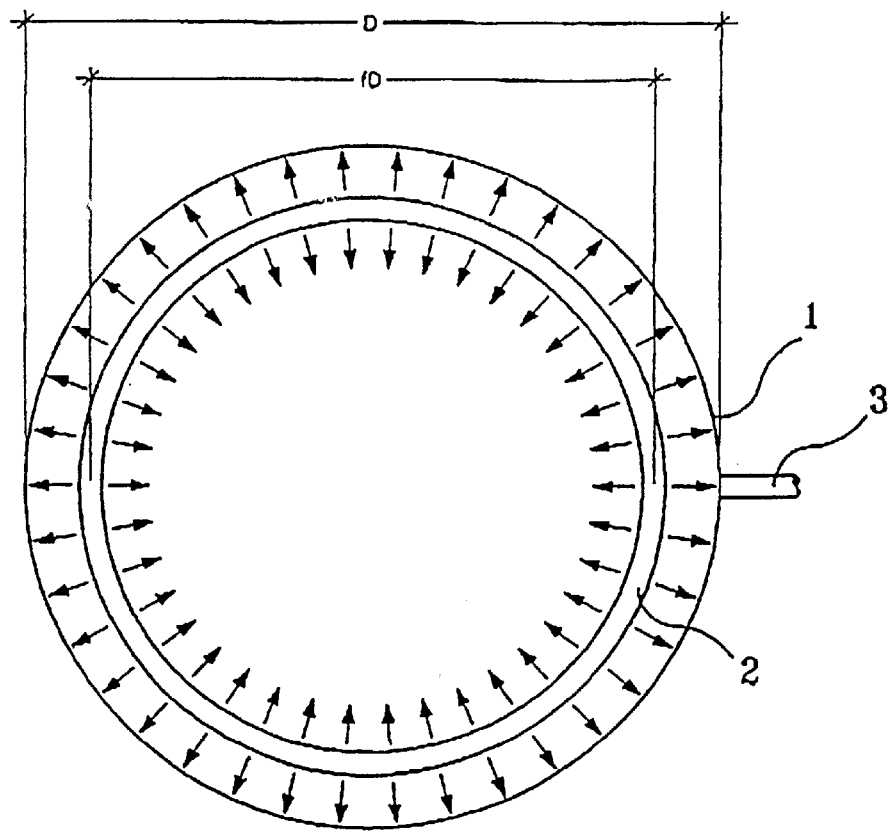
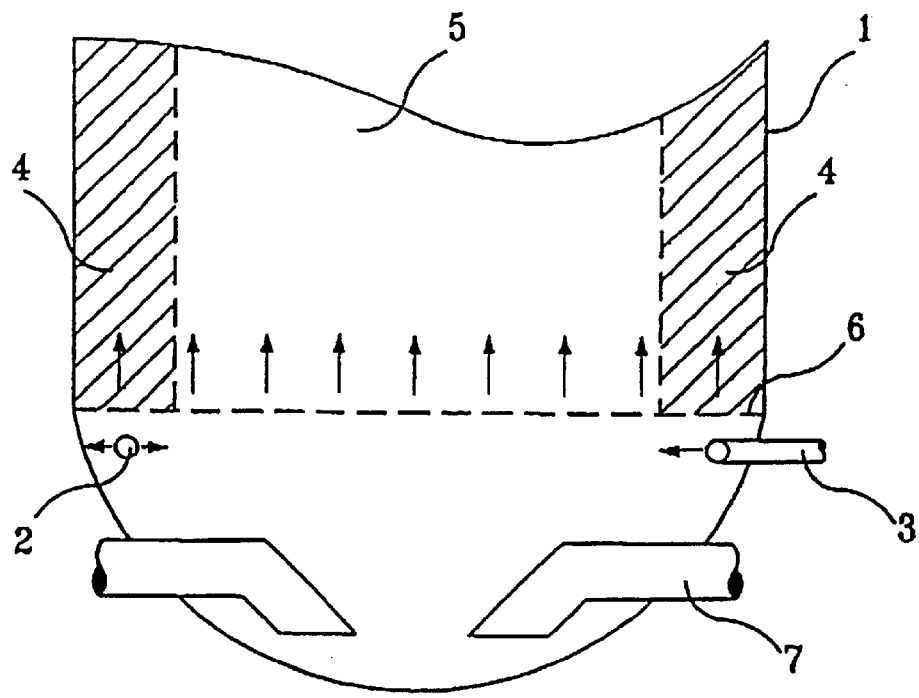
FIG.2

POLYMERIZATION PROCESS

This application is a continuation of application Ser. No. PCT/GB99/01577, filed May 18, 1999.

BACKGROUND OF THE INVENTION

The present invention relates to a process for the gas phase polymerization of olefins in a fluidized bed reactor and in particular to the introduction of a deactivating agent into the reactor without terminating the polymerization reaction.

It is known to polymerise one or more alpha-olefins, such as ethylene or propylene, in the gas-phase in a fluidized bed reactor, in the presence of a catalyst based on a transition metal belonging to the groups IV, V or VI of the Periodic Table of the Elements; in particular in the presence of a catalyst of the Ziegler-Natta type, chromium oxide type or a metallocene catalyst. Catalyst particles, together with growing and formed polymer particles are kept in the fluidized and/or agitated state in a gaseous reaction mixture containing the alpha-olefin or alpha-olefins, which are introduced continuously into the reactor. The catalyst is introduced continuously or intermittently into the reactor while the polymer constituting the fluidized bed is withdrawn from the reactor, also continuously or intermittently. The heat of the polymerization reaction is essentially removed by the gaseous reaction mixture, which may be passed through a heat transfer means before being recycled into the reactor.

Fouling of the reactor wall is a well-known phenomenon in gas phase polymerization processes. Hot spots and hence fouling are likely to occur in the vicinity of, especially at or close to the reactor walls. Where a polymerization reactor is equipped with a fluidisation grid the hot spots/fouling typically occur in the region 0.25 D to 0.75 D above the grid (where D is the diameter of the reactor). Hot spots/fouling may also occur in the disengagement zone. Such hot spots/fouling are usually detected by the use of thermocouples or temperature indicators either attached to the reactor wall or inserted a small distance into the reactor itself. Such detection means may be associated with means for recording temperature variations and possibly visual and/or audible alarms. The explanations for the occurrence of fouling are many and varied. Operating conditions, even small variations in the reaction conditions have been considered important to the occurrence of fouling. For example, poor or loss of fluidizing gas flow can cause catalyst particles, formed polymer particles and growing polymer particles to be insufficiently cooled by the gaseous reaction mixture passing through the reactor. This insufficient heat removal gives rise to hot spots, which can lead to the melting of the catalyst/polymer particles resulting in the formation of agglomerates of molten catalyst/polymer which then may melt on and cause fouling of the reactor walls. Other reasons given for the occurrence of fouling include the type of catalyst used and the presence of static electricity. Whatever the explanation of its occurrence the presence of fouling very often induces fluidization pertubations which can lead to irreversible process problems. For example, when the agglomerates become heavy, they can come off the wall and block the fluidization grid and/or the polymer withdrawal system. Severe hot spot and therefore fouling problems may necessitate a shut-down of the reactor. One way in which the polymerization process can be terminated quickly to avoid irreversible process problems and/or a reactor shut down is to introduce a deactivating agent whose purpose is to kill or terminate the fluidized bed polymerization.

European Patent EP-B-0 471 479 discloses a process for completely stopping a gas-phase alpha-olefin polymerization reaction carried out with the aid of a chromium oxide-based catalyst by introducing a deactivating agent such as oxygen, ammonia or carbon monoxide into the polymerization reactor.

U.S. Pat. No. 4,306,044 discloses a system for introducing carbon dioxide into a gas-phase olefin polymerization process to at least reduce the rate of the polymerization reaction.

Thus there remains the need to reduce or even eliminate hot spots/fouling in gas-phase olefin polymerization processes without terminating the polymerization reaction.

It has now been unexpectedly found that hot spots and hence fouling can be reduced or even eliminated by using the process according to the present invention without the need to stop production or shut down the reactor.

SUMMARY OF THE INVENTION

Thus, according to the present invention there is provided a process for the gas phase polymerization of one or more alpha-olefins in the presence of a polymerization catalyst system under reactive conditions in a fluidized bed reactor which process comprises introducing into the reactor a deactivating agent characterized in that the deactivating agent is introduced close to the reactor wall and that said introduction does not terminate the polymerization reaction.

BRIEF DESCRIPTION OF THE DRAWINGS

The process according to the present invention will now be illustrated with reference to the accompanying drawings.

FIG. 1 is a cross-sectional view of a cylindrical polymerization reactor.

FIG. 2 is a front view of the lower part of a cylindrical polymerization reactor.

DETAILED DESCRIPTION OF THE INVENTION

The deactivating agent may be selected from a wide variety of products which are known to or are capable of reducing the polymerization rate of an alpha-olefin in the presence of a catalyst based on a transition metal e.g. a catalyst of the Ziegler-Natta type or a metallocene catalyst, or a chromium oxide type catalyst. The deactivating agent can be selected especially from polymerization inhibitors or from poisons known for this type of reaction such as carbon monoxide, carbon dioxide, carbon disulphide, carbon oxysulphide, nitrogen oxides and peroxides, oxygen, alcohols, aldehydes, ketones, thiols and water. Deactivating agents which can be selected in particular are carbon monoxide, oxygen and water, especially carbon monoxide.

The deactivating agent may be employed alone or, preferably, diluted in an inert gas such as nitrogen. When carbon monoxide is employed as deactivating agent, it may be employed in the form of a gaseous mixture with an inert gas such as nitrogen. A mixture of two or more deactivating agents may be employed.

The deactivating agent is introduced into the polymerization reactor in a quantity which is effective to deactivate hot spots and fouling at or in close proximity to the reactor walls. The quantity of deactivating agent required will therefore usually be less than the minimum quantity theoretically necessary for terminating the polymerization reaction. Preferably, the deactivating agent is introduced into the polymerization reactor in an amount such that the weight ratio of the deactivating agent to the catalyst is in the range 0.00015–0.0011:1, preferably 0.00035–0.001:1, especially 0.0006–0.0009:1. For example it has been found to be possible to deactivate hot spots and fouling at or in close proximity to the reactor walls by introducing into the polymerization reactor 0.0002–0.0011 g of carbon monoxide per gram of catalyst. The use of a quantity of deactivating agent which is too large would have the effect of stopping the polymerization reaction. The minimum quantity of deactivating agent necessary for stopping a polymerization reaction can be obtained by previous experimentation performed in a gas phase reactor working with known quantities of catalyst and of deactivating agent.

The deactivating agent may be introduced on a continuous basis but it is preferably introduced into the polymerization reactor over a relatively short period of time typically less than 5 minutes. The period of introduction of the deactivating agent is advantageously as short as possible and is preferably shorter than one minute and more preferably shorter than 30 seconds. The deactivating agent may be introduced intermittently throughout the polymerization reaction i.e. it may be introduced as and when required to deactivate any hot spots/fouling which form throughout the polymerization reaction. Furthermore, the feeding of catalyst and/or olefin into the polymerization reactor need not be discontinued.

The deactivating agent is introduced at a point situated as close as possible to the reactor wall such that the deactivating agent deactivates or kills those hot spots/fouling which are at or close to the reactor wall without deactivating the entire bed. For example the deactivating agent may be introduced at the reactor wall and up to a distance of from 0.1 D to 0.2 D from the reactor wall where D is the reactor diameter. Furthermore, it may be advantageously introduced at a plurality of points, especially at two or more points close to the reactor wall. The deactivating agent may be introduced into the reactor at one or more points above or below the bed. Preferably it is introduced at a plurality of points above the bed e.g. in the disengagement zone, and/or below the bed e.g. underneath a fluidization grid. More especially it is introduced at a plurality of points underneath a fluidization grid and up to a distance of 0.2 D from the reactor wall.

The deactivating agent may be introduced into the reactor by any suitable means which provides a substantially uniform concentration of deactivating agent around at least part of the reactor wall.

In a preferred embodiment of the present invention the deactivating agent is introduced close to the reactor wall by means of a distribution ring. Distribution rings are well-known in the art. The spacing of the distribution holes around the ring are such as to provide a uniform distribution of a gaseous material around the whole of the distribution ring.

The distribution holes in the ring can be directed in any direction e.g upwards, downwards, horizontal from the ring provided that the size of the jets is sufficiently small to avoid excessive quantities of deactivating agent being directed towards the centre of the reactor. Classical correlations and standard chemical engineering can be used to avoid this in the design procedure. Preferably the direction of the distribution ring holes is horizontal and towards the reactor wall.

Where a fluidization grid is employed, the distribution ring may be located either above or below the fluidization grid, preferably below the grid, especially below the grid up to a distance of 25 cm below the grid and in particular 5 to 10 cm below the grid.

For a given reactor diameter, the outer diameter of the distribution ring is preferably the maximum diameter achievable notwithstanding design considerations and mechanical constraints of fitting the distribution ring immediately adjacent to the reactor wall. In particular, the outer diameter of the distribution ring may be between 0.5 D to 1.0 D, e.g 0.75 D to 1.0 D, such as 0.90 D to 1.0 D, where D is the diameter of the reactor.

Irrespective of whether the distribution ring is above or below a fluidization grid the distribution ring preferably provides an essentially uniform concentration of deactivating agent in the immediate vicinity of the reactor wall.

In a particularly preferred embodiment of the present invention the deactivating agent is introduced into the reactor by means of a distribution ring having distribution holes which are horizontal and directed towards the reactor wall. The distribution ring has an outer diameter of between 0.90 D and 1.0 D (where D is the reactor diameter) and when a fluidization grid is used, the distribution ring is positioned 5 to 10 cm below the grid.

The polymerization reaction may be conducted in a reactor containing a fluidized bed by techniques known per se and using equipment such as that described in French patent No. 2 207 145, French patent No. 2 335 526, EP-B-0 699213, EP-B-0 89691 or U.S. Pat. No. 5,352,749, the disclosure of which are incorporated herein by reference. The apparatus can comprise essentially a fluidized-bed polymerization reactor comprising a vertical cylinder equipped with a fluidization grid and supporting a disengagement chamber, a conduit for recycling the gas mixture, connecting the top of the disengagement chamber to the base of the reactor, which recycle conduit is provided with at least one heat exchanger and a gas compressor and with a conduit for introducing alpha-olefins. During the course of the polymerization the bed comprises catalyst particles, growing polymer particles and formed polymer particles. The bed is maintained in a fluidized state by introducing a fluidizing medium at a sufficient flow rate to cause the particles to separate and act as a fluid. The fluidizing medium may consist of a single phase e.g a gas phase or it may be two phase for example it may consist of a gas phase and a liquid phase, for example, a mixture of gas and entrained liquid. In such a case the quantity of liquid in the gas phase may be about from 1–50 weight percent, for example 10–20 weight percent, preferably less than 10 weight percent, provided always that the velocity of the two-phase fluidizing medium is high enough to keep the liquid phase in suspension in the gas and to support the fluidized bed in the reactor. The two-phase fluidizing medium of gas and entrained liquid may be formed by cooling part or all of the unreacted fluids from the reactor below the dew point and re-introducing said two-phase mixture into the reactor. Alternatively a two-phase fluidizing medium may be formed within the reactor, for example by separately injecting e.g underneath a fluidization grid or directly into the fluidized bed, gas and liquid under conditions which will produce a two-phase fluidizing medium. A single phase fluidizing medium or a substantially single phase fluidizing medium such as a gas phase fluidizing medium may be formed by cooling a recycle gaseous stream to a temperature sufficient to form a liquid and a gas and by separating the liquid from the gas and then feeding the gas into the reactor, for example by injection below the fluidization grid.

Alternatively, the recycle gaseous stream may be divided into a first stream and a second stream. The first stream is passed directly to the reactor in a conventional way by injection below the fluidization grid and the second stream is cooled and the stream is separated into a gas and liquid stream. The gas stream may be returned to the first stream and re-introduced into the reactor below the bed, for example, below the fluidization grid if such a grid is employed.

The fluidizing medium may contain unreacted gaseous monomers, make-up monomers to replace monomers consumed by the polymerization reaction, and optionally inert hydrocarbons e.g ethane, propane, butane, isobutane or isopentane, inert gases such as nitrogen, reaction activators or moderators e.g hydrogen.

The fluidization grid positioned above the point of recycle ensures proper distribution of the fluidizing medium to the bed and acts as a support for the bed when the supply of gas is cut off.

The polymerization reaction may be carried out in the presence of a catalyst system of the Ziegler-Natta type, said catalyst essentially comprising a compound of a transition metal.

High-activity catalyst systems have been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal (preferably titanium and/or vanadium and/or zirconium), of magnesium and of halogen.

The Ziegler-Natta type catalyst can be used directly as such or in the form of a prepolymer. The conversion to prepolymer is generally carried out by bringing the catalyst into contact with one or more alpha-olefins in amounts such that the prepolymer contains between 0.002 and 10 millimol of transition metal per gram.

A co-catalyst may also be advantageously used with the Ziegler-Natta catalyst such as organometallic compounds of metals belonging to Groups I, II or III of the Periodic Table of the elements, in particular organoaluminium compounds.

The process is also particularly suitable for use with Ziegler catalysts supported on silica. Preferred catalyst systems for use in the present invention are those disclosed in WO9309147, WO9513873, WO9534380 and WO9905187, the content of which is hereby incorporated by reference.

The polymerization reaction may also be carried out using a metallocene type catalyst such as those described in EP 0 129368, EP 0 206794, EP 0 420436 and EP 0 416815 the subject matter of which is incorporated herein by reference.

It is also possible to use late transition metal e.g platinum or palladium, catalyst complexes such as those described in WO 9623010 the subject matter of which is incorporated herein by reference.

The process can also be applied with the iron and/or cobalt complexes catalysts, e.g. such as those disclosed in WO98/27124 or in pending application WOGB98/2638.

The catalyst may suitably be employed in the form of a prepolymer powder prepared beforehand during a prepolymerization stage with the aid of a catalyst as described above. The prepolymerization may be carried out by any suitable process, for example, polymerization in a liquid hydrocarbon diluent or in the gas phase using a batch process, a semi-continuous process or a continuous process.

For details on prepolymerization see U.S. Pat. Nos. 4,923, 833, 5,283,278 and 4,921,825 and EP-B-0279 863 all of which are herein fully incorporated by reference.

In another embodiment of the invention, the catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the catalyst system of the invention includes a polyolefin wax or tackifier or the like.

The polymerization reaction is generally carried out under a pressure of 0.5 to 6 MPa and at a temperature of 30° C. to 135° C. The process is suitable for the polymerization of one or more alpha-olefins containing 2 to 8 carbon atoms, in particular for the polymerization of ethylene or propylene. It is especially suitable for the copolymerization of ethylene with at least one alpha-olefin containing from 3 to 8 carbon atoms, or for the copolymerization of propylene with at least one alpha-olefin containing from 4 to 8 carbon atoms.

FIG. 1 illustrates part of a cylindrical polymerization reactor comprising a reactor (1) of diameter (D), an entry point (3) into the reactor (1) for the deactivating agent and a distribution ring (2) of diameter fD.

FIG. 2 illustrates the lower part of a polymerization reactor comprising a reactor wall (1), a fluidization grid (6) and below the fluidization grid (6) a distribution ring (2). The fluidizing gas enters the reactor (1) through entry point (7) and moves upwards towards and through the fluidization grid (6). Deactivating agent which enters the reactor (1) at entry point (3) is transported through the distribution ring (2) by the upwardly flowing fluidizing gas and into the deactivating zones (4). No or little deactivating agent is transported into zone (5).

The following Examples will illustrate the present invention.

EXAMPLE 1

The process is carried out in a fluidized bed gas phase polymerization reactor consisting of a vertical cylinder of diameter 0.75 m and height 5 m and surmounted by a velocity reduction chamber. In its lower part, the reactor is equipped with a fluidization grid and an external line for recycling gas, connecting the top of the velocity reduction chamber to the lower part of the reactor, situated under the fluidization grid. The gas recycling line is equipped with a compressor and with a heat transfer means. Opening into the gas recycling line there are, in particular, the feed lines for ethylene, 1-butene, hydrogen and nitrogen, which represent the main constituents of the gas reaction mixture passing through the fluidized bed.

The distribution ring has an outer diameter of 0.705 m and is located 6 cm below the fluidization grid. A schematic description of said distribution ring is given in FIGS. 1 and 2.

Above the fluidization grid the reactor contains a fluidized bed consisting of a linear low density polyethylene powder. The gas reaction mixture, which contains ethylene, 1-butene, hydrogen and nitrogen passes through the fluidized bed at a pressure of 2 MPa, at 80° C. and with an upward fluidization velocity of 0.36 m/s.

The polymerization reactor is fitted with three sets of wall temperature indicators at 0.5 m 0.1m and 1.5 m above the fluidization grid.

The catalyst used is a Ziegler-Natta catalyst prepared according to Example 1 of EP-A-0 529 977.

Under these conditions a linear low density polyethylene with a density of 0.918, a melt index of 0.9 g/10 minutes under a 2.16-kg load at 190° C. is manufactured at an output of 97 kg/h.

Following a period of stable operation, for unknown reasons the wall temperature indicator at the 0.5 m position reached 85° C.; in response, carbon monoxide gas diluted to a level of 10000 ppm in a nitrogen gas carrier was introduced into the reactor via the distribution ring. The quantity of carbon monoxide injected was 0.00025 g of CO per g of catalyst present in the bed. Within a period of approximately 30 seconds all of the wall temperature indicators were seen to stop increasing and within 5 minutes had returned to their nominal values of 80° C. During this period the feeding of catalyst into the reactor was not discontinued and no production rate change was observed.

What is claimed is:

1. A process for the gas phase polymerization of one or more alpha-olefins in the presence of a polymerization catalyst system under reactive conditions in a fluidized bed reactor which process comprises introducing into the reactor a deactivating agent over a period of time not more than five minutes to reduce hot spots in the reactor during the polymerization reaction, wherein said introduction does not terminate the polymerization reaction and wherein the deactivating agent is introduced into the reactor at a distance of up to 0.2 D from the reactor wall where D is the diameter of the reactor.

2. A process according to claim 1 wherein the deactivating agent is introduced at one or more points below a fluidization grid.

3. A process according to claim 1 wherein the deactivating agent is introduced at one or more points above the bed.

4. A process according to claim 1 wherein a distribution ring is employed to introduce the deactivating agent.

5. A process according to claim 4 wherein the distribution ring has an outer diameter of from 0.50 D to 1.0 D where D is the diameter of the reactor.

6. A process according to claim 4 wherein the distribution ring is located below the fluidization grid up to a distance of 25 cm below the grid.

7. A process according to claim 1 in which the deactivating agent is introduced in a weight ratio of deactivating agent to catalyst of 0.00015–0.0011:1.

8. A process according to claim 1 in which the deactivating agent is a polymerization inhibitor.

9. A process according to claim 8 wherein the polymerization inhibitor is selected from carbon monoxide, water and oxygen.

10. A process according claim 1 wherein the deactivating agent is carbon monoxide and is introduced in a weight ratio of carbon monoxide to catalyst of 0.0002–0.0011:1.

11. A process according to claim 1 wherein the catalyst is a catalyst of the Ziegler-Natta type based on magnesium, halogen, titanium and/or vanadium and/or zirconium.

12. A process according to claim 1 wherein the catalyst is a metallocene catalyst.

13. A process according to claim 1 wherein the alpha-olefin(s) contain from 2 to 8 carbon atoms.

* * * * *